(12) United States Patent
Herzog et al.

(10) Patent No.: US 7,774,369 B2
(45) Date of Patent: Aug. 10, 2010

(54) CONFIGURING COMPUTER SYSTEMS WITH BUSINESS CONFIGURATION INFORMATION

(75) Inventors: Wolfgang Herzog, Reilingen (DE); Ulrich Frenzel, Heidelberg (DE); Klaus-Peter Lang, Brackenheim (DE)

(73) Assignee: SAP Aktiengesellschaft, Walldorf (DE)

(*) Notice: Subject to any disclaimer, the term of this patent is extended or adjusted under 35 U.S.C. 154(b) by 861 days.

(21) Appl. No.: 10/885,007

(22) Filed: Jul. 7, 2004

(65) Prior Publication Data
US 2006/0010163 A1    Jan. 12, 2006

(51) Int. Cl.
G06F 7/00    (2006.01)
G06F 17/30   (2006.01)
G06F 3/00    (2006.01)
G06F 9/44    (2006.01)

(52) U.S. Cl. .................. 707/793; 715/747; 717/121
(58) Field of Classification Search ................. 707/104.1
See application file for complete search history.

(56) References Cited

U.S. PATENT DOCUMENTS

| | | | |
|---|---|---|---|
| 5,163,130 A | 11/1992 | Hullot | |
| 5,321,803 A | 6/1994 | Ditter, Jr. | |
| 5,499,357 A | 3/1996 | Sonty et al. | |
| 5,517,635 A | 5/1996 | Cross et al. | |
| 5,553,218 A | 9/1996 | Li et al. | |
| 5,613,122 A | 3/1997 | Burnard et al. | |
| 5,619,716 A * | 4/1997 | Nonaka et al. | 717/167 |
| 5,657,460 A | 8/1997 | Egan et al. | |
| 5,664,206 A | 9/1997 | Murow et al. | |
| 5,687,366 A | 11/1997 | Harvey et al. | |
| 5,717,924 A | 2/1998 | Kawai | |
| 5,748,980 A | 5/1998 | Lipe et al. | |
| 5,809,329 A | 9/1998 | Lichtman et al. | |
| 5,812,964 A | 9/1998 | Finger | |
| 5,835,768 A | 11/1998 | Miller et al. | |
| 5,838,918 A | 11/1998 | Prager et al. | |
| 5,844,554 A * | 12/1998 | Geller et al. | 715/744 |
| 5,873,111 A | 2/1999 | Edberg | |
| 5,913,218 A | 6/1999 | Carney et al. | |
| 5,917,484 A | 6/1999 | Mullaney | |

(Continued)

FOREIGN PATENT DOCUMENTS

EP    1443700 A3    10/2005

(Continued)

OTHER PUBLICATIONS

SAP Service Marketplace publication entitled "Customizing Scout," Published Mar. 19, 2001; pp. 1-2.

(Continued)

Primary Examiner—John R. Cottingham
Assistant Examiner—Kimberly Lovel
(74) Attorney, Agent, or Firm—Fish & Richardson P.C.

(57) ABSTRACT

A configuration server includes a configuration repository that stores a wide range of configuration information for possible use by application programs. The configuration repository may include configuration parameters, settings for the parameters, and meta-data of definitions and descriptions of the parameters. Configuration information is selected from the configuration repository and stored in a configuration directory for later use by application programs at runtime. The configuration information is accessed from the configuration directory when needed by an application program or a component thereof.

22 Claims, 9 Drawing Sheets

U.S. PATENT DOCUMENTS

| | | | |
|---|---|---|---|
| 5,923,850 A | 7/1999 | Barroux | |
| 5,945,988 A | 8/1999 | Williams et al. | |
| 5,950,190 A | 9/1999 | Yeager et al. | |
| 5,980,078 A | 11/1999 | Krivoshein et al. | |
| 6,025,836 A | 2/2000 | McBride | |
| 6,038,586 A | 3/2000 | Frye | |
| 6,047,129 A | 4/2000 | Frye | |
| 6,047,279 A | 4/2000 | Barrack et al. | |
| 6,061,693 A | 5/2000 | Carney et al. | |
| 6,085,165 A | 7/2000 | Ulwick | |
| 6,098,054 A | 8/2000 | McCollom et al. | |
| 6,098,098 A | 8/2000 | Sandahl et al. | |
| 6,128,730 A | 10/2000 | Levine | |
| 6,161,176 A | 12/2000 | Hunter et al. | |
| 6,170,065 B1 | 1/2001 | Kobata et al. | |
| 6,181,340 B1 | 1/2001 | Alimpich et al. | |
| 6,202,207 B1 | 3/2001 | Donohue | |
| 6,219,696 B1 | 4/2001 | Wynblatt et al. | |
| 6,219,698 B1 | 4/2001 | Iannucci et al. | |
| 6,219,719 B1 | 4/2001 | Graf | |
| 6,243,717 B1 | 6/2001 | Gordon et al. | |
| 6,243,747 B1 | 6/2001 | Lewis et al. | |
| 6,304,857 B1 * | 10/2001 | Heindel et al. | 705/34 |
| 6,330,586 B1 | 12/2001 | Yates et al. | |
| 6,339,755 B1 | 1/2002 | Hetherington et al. | |
| 6,349,304 B1 | 2/2002 | Boldt et al. | |
| 6,353,884 B1 | 3/2002 | Schmitz et al. | |
| 6,366,917 B1 | 4/2002 | St. John Herbert, III | |
| 6,422,870 B1 | 7/2002 | Ohsawa | |
| 6,463,430 B1 | 10/2002 | Brady et al. | |
| 6,469,713 B2 | 10/2002 | Hetherington et al. | |
| 6,473,794 B1 | 10/2002 | Guheen et al. | |
| 6,492,995 B1 | 12/2002 | Atkin et al. | |
| 6,493,735 B1 | 12/2002 | Kumhyr | |
| 6,496,793 B1 | 12/2002 | Veditz et al. | |
| 6,496,844 B1 | 12/2002 | Hetherington et al. | |
| 6,507,813 B2 | 1/2003 | Veditz et al. | |
| 6,519,571 B1 | 2/2003 | Guheen et al. | |
| 6,532,442 B1 | 3/2003 | Schumacher et al. | |
| 6,532,491 B1 | 3/2003 | Lakis et al. | |
| 6,538,668 B1 | 3/2003 | Ruberg et al. | |
| 6,560,704 B2 | 5/2003 | Dieterman et al. | |
| 6,624,388 B1 | 9/2003 | Blankenship et al. | |
| 6,654,762 B2 * | 11/2003 | Cheng et al. | 707/102 |
| 6,667,736 B1 | 12/2003 | Bhansali et al. | |
| 6,681,382 B1 | 1/2004 | Kakumano et al. | |
| 6,684,222 B1 | 1/2004 | Cornelius et al. | |
| 6,701,428 B1 | 3/2004 | Harvey, III et al. | |
| 6,718,464 B2 | 4/2004 | Cromer et al. | |
| 6,725,229 B2 | 4/2004 | Majewski et al. | |
| 6,728,877 B2 | 4/2004 | Mackin et al. | |
| 6,766,334 B1 | 7/2004 | Kafer et al. | |
| 6,775,829 B1 | 8/2004 | Kroening | |
| 6,775,830 B1 | 8/2004 | Matsunami et al. | |
| 6,779,000 B1 | 8/2004 | Northrup | |
| 6,792,462 B2 | 9/2004 | Bernhardt et al. | |
| 6,804,710 B1 | 10/2004 | Kawada et al. | |
| 6,816,964 B1 | 11/2004 | Suzuki et al. | |
| 6,868,427 B2 | 3/2005 | Herzog et al. | |
| 6,922,705 B1 | 7/2005 | Northrup | |
| 6,963,908 B1 | 11/2005 | Lynch et al. | |
| 6,990,601 B1 | 1/2006 | Tsuneya et al. | |
| 7,003,527 B1 | 2/2006 | Lavallee et al. | |
| 7,058,924 B2 * | 6/2006 | Greenstein | 717/100 |
| 7,065,562 B2 | 6/2006 | Courtney | |
| 7,130,870 B1 | 10/2006 | Pecina et al. | |
| 7,165,041 B1 | 1/2007 | Guheen et al. | |
| 2001/0042104 A1 | 11/2001 | Donoho et al. | |
| 2002/0130834 A1 | 9/2002 | Madarasz et al. | |
| 2002/0138440 A1 | 9/2002 | Vaidyanathan et al. | |
| 2002/0149601 A1 | 10/2002 | Rajarajan et al. | |
| 2002/0149615 A1 | 10/2002 | Rajarajan et al. | |
| 2002/0178271 A1 | 11/2002 | Graham et al. | |
| 2002/0184308 A1 | 12/2002 | Levy et al. | |
| 2003/0028624 A1 | 2/2003 | Hasan et al. | |
| 2003/0191776 A1 | 10/2003 | Obrador | |
| 2003/0212684 A1 | 11/2003 | Meyer et al. | |
| 2003/0222903 A1 | 12/2003 | Herzog et al. | |
| 2003/0225741 A1 | 12/2003 | Herzog et al. | |
| 2004/0002907 A1 * | 1/2004 | Tosswill | 705/34 |
| 2004/0030781 A1 | 2/2004 | Etesse et al. | |
| 2004/0088142 A1 * | 5/2004 | Ashley et al. | 702/184 |
| 2004/0143428 A1 | 7/2004 | Rappaport et al. | |
| 2004/0158575 A1 | 8/2004 | Jacquemot et al. | |
| 2004/0215656 A1 | 10/2004 | Dill et al. | |
| 2004/0216090 A1 | 10/2004 | Kaler et al. | |
| 2004/0236547 A1 | 11/2004 | Rappaport et al. | |
| 2004/0250247 A1 | 12/2004 | Deeths et al. | |
| 2005/0004942 A1 | 1/2005 | Madsen et al. | |
| 2005/0015491 A1 * | 1/2005 | Koeppel | 709/226 |
| 2005/0222969 A1 | 10/2005 | Yip et al. | |
| 2006/0031122 A1 | 2/2006 | Lane et al. | |

FOREIGN PATENT DOCUMENTS

| | | | |
|---|---|---|---|
| GB | 2334601 A | 8/1999 | |

OTHER PUBLICATIONS

SAP Best Practices J00 Essential Information; pp. 1-53; (Nov. 2003).

Office Action (U.S. Appl. No. 10/885,114) Jul. 25, 2007, 23 pages.

Non-Final Office Action issued in U.S. Appl. No. 10/885,114 on Feb. 26, 2007, 17 pages.

Non-Final Office Action issued in U.S. Appl. No. 10/885,114 on Jan. 10, 2008, 22 pages (including screen shots of "Tax Cut 2002", purportedly 2002, from H7R Block).

Final Office Action issued in U.S. Appl. No. 10/885,114 on Jul. 22, 2008, 17 pages, (including "Order Details", order details for TaxCut 2002, purportedly retrieved from www.staples.com on Jul. 14, 2008).

Non-Final Office Action issued in U.S. Appl. No. 10/885,114 on Mar. 19, 2009, 18 pages.

Office Action issued with regard to U.S. Appl. No. 10/885,114 on Sep. 30, 2009, 21 pages.

* cited by examiner

| Standard Payment Term | Standard Currency | Order history | | | |
|---|---|---|---|---|---|
| | | Order No. | Amount | Payment Term used | Paid after (days) |
| 0002 | € | 4711-012 | 3867,00 | 0002 | 2 |
| | | 9230-892 | 220,00 | 0001 | 6 |

FIG. 4

CONFIGURING COMPUTER SYSTEMS WITH BUSINESS CONFIGURATION INFORMATION

TECHNICAL FIELD

This description relates to centrally storing configuration information for use by one or more applications.

BACKGROUND

Computer systems often are used to manage and process business data. To do so, a business enterprise may use various application programs running on one or more computer systems. Application programs may be used to process business transactions, such as taking and fulfilling customer orders, providing supply chain and inventory management, performing human resource management functions, and performing financial management functions. Application programs also may be used for analyzing data, including analyzing data obtained through transaction processing systems. A business enterprise may use multiple application programs running on one or more computer systems.

An application program may be customized to meet the specific requirements of the environment in which the application program is operating. For example, parameters in an application program may be customized to meet the requirements of a particular country, a particular industry, a particular company, or a particular department in a company so that the system accurately fulfills specific requirements of the operating environment, even highly specialized or localized requirements. Examples of customization include language parameter customization, unit parameter customization (e.g., metric versus English), format parameter customization (e.g., month/day/year versus day/month/year), work process parameter customization, and notation parameter customization. Typically, the customization occurs for an application program prior to or as part of deploying the application program in the business enterprise.

Although application program customization allows an application program to meet one or more specific requirements of the operating environment, application program customization also complicates operations that span application programs with differing customization settings, or the use of the same application program at different sites with differing customization settings. For example, if the customization settings of a particular class of data objects in two different application programs are different, then data objects from this class may not be directly comparable or transferable.

One approach to customizing application programs is for each of the application programs to store locally the necessary configuration information. In some cases, multiple application programs may need the same configuration information and the configuration information is redundantly stored by each of application programs needing the configuration information. For proper operation, the consistency of the redundantly stored configuration information must be maintained in each application program. For example, when redundantly stored configuration information is updated, all copies of the configuration information held by an application program needing the configuration information must be updated. Ensuring consistency across the redundantly stored configuration information may be burdensome. This may be particularly true in large, distributed enterprise information technology systems that have multiple application programs operating on distributed computer systems and having large numbers of data objects and business processes. Furthermore, redundantly storing configuration information and checking for consistency across the configuration information generally adds to the operating costs of the application programs.

SUMMARY

A configuration server stores configuration information needed by one or more application programs, and the configuration information is accessed from the configuration server when needed by an application program or a component thereof. In some implementations, the configuration information may be accessed through the exchange of messages between the configuration server and the application program or application program component needing the configuration information or a portion thereof. The configuration information also may be accessed through synchronous access in which an application component requests, using synchronous communication, the needed configuration information using synchronous communication with the configuration server.

In some implementations, the configuration server also includes a configuration repository that stores a wide range of configuration information for possible use by the application programs. The configuration repository may include configuration parameters, settings for the parameters, and meta-data of definitions and descriptions of the parameters. The configuration repository may be delivered to a business enterprise with configuration information that may be applicable to multiple industries, countries, or scenarios in which the application programs are run. Prior to deploying the application programs, the relevant configuration information is selected from the configuration repository for later use by the application programs at runtime. In this way, the same configuration repository may be delivered to multiple business enterprises for deployment in a variety of operating environments and contexts. This may be particularly useful in the deployment of application programs in a business enterprise that operates across multiple industries, countries, and/or uses different business processes in different components of the business enterprise. This also may be useful in the context of commercial software sales in which customers operate in different industries, countries, and/or use different business processes.

In one general aspect, configuration information is handled by receiving, from a user, a selection of configuration information stored in a configuration repository for use by multiple versions of a software application program. The configuration information includes configuration information entries. Each configuration information entry is associated with a configuration component that is used by the software application program. Each configuration information entry has a configuration attribute having a value for the associated configuration information entry. The configuration information entries that correspond to the selected configuration information are stored in a configuration directory for use by a particular version of the software application program. The configuration information entries of the configuration directory are provided to the particular version of the software application program.

Implementations may include one or more of the following features. For example, the configuration information entries may be organized in the configuration repository in a variety of ways. The configuration information entries may be organized based on an association of a particular configuration information entry having a particular value with various types of information. For example, the configuration information entries may be organized based on an association of a particular configuration information entry having a particular value with a particular type of industry, with a particular country or geographic region, with a particular business process, with a particular software application, or with a particular data type.

The data management technique used by the configuration repository is different from a data management technique used by the configuration directory.

An indication of a configuration information entry in the configuration repository may be received. The indicated configuration information entry in the configuration repository may be accessed and stored in the configuration directory. The indication of a configuration information entry may be received based on a variety of types of associations of the configuration information entry. For example, the configuration information entry may be received based on an association of the configuration information with a particular type of industry, with a particular country or geographic region, with a particular business process, with a particular software application, or with a particular data type. The configuration information entry in the configuration directory may be provided to the particular version of the software application program for use in configuring the particular version of the software application program.

Implementations of the techniques discussed above may include a method or process, a system or apparatus, or computer software on a computer-accessible medium.

Storing configuration information in a repository from which a portion of configuration information is selected for use in a particular application program may be useful. For example, storing the configuration information enables the improved creation and delivery of configuration content for different market segments. In one example, a configuration server may be deployed with different configuration content for different market segments, or the configuration server may be deployed with configuration content from multiple market segments. In another example, when an application is installed or deployed, the application may be configured with configuration content to be used in operating the application in which the configuration content is selected from a collection of possible configuration content. The use of a configuration server may be helpful in such a case, though a configuration server is not necessary to provide a pool of possible configuration content that is separate from the smaller set of configuration content that is used in the operation of an application.

It is useful for applications to be configured to access or otherwise accept appropriate configuration information from a configuration server and not be configured to store specific configuration information. For example, configuration information is only specified and stored once in the configuration server for use by all of the application programs. Storing the configuration information centrally may result in a small, highly visible, and highly cohesive configuration information model. As a result, system complexity and operating costs may be reduced because the configuration information does not need to be stored and maintained redundantly and independently for each of the application programs.

Finally, the use of a configuration server may help to simplify upgrading from one version to another version of an application program. When specific configuration information is not specified in each application program, upgrading an application program to a new version may not involve reconfiguring the application program. Instead the upgraded application program may be deployed without configuration, much as was done when the application program was first deployed.

The details of one or more of the implementations are set forth in the accompanying drawings and description below. Other features will be apparent from the description and drawings, and from the claims.

DESCRIPTION OF DRAWINGS

FIG. 4 is an example of how an application may use the configuration information shown in FIG. 3.

Like reference symbols in the various drawings indicate like elements.

DETAILED DESCRIPTION

Figure 1:
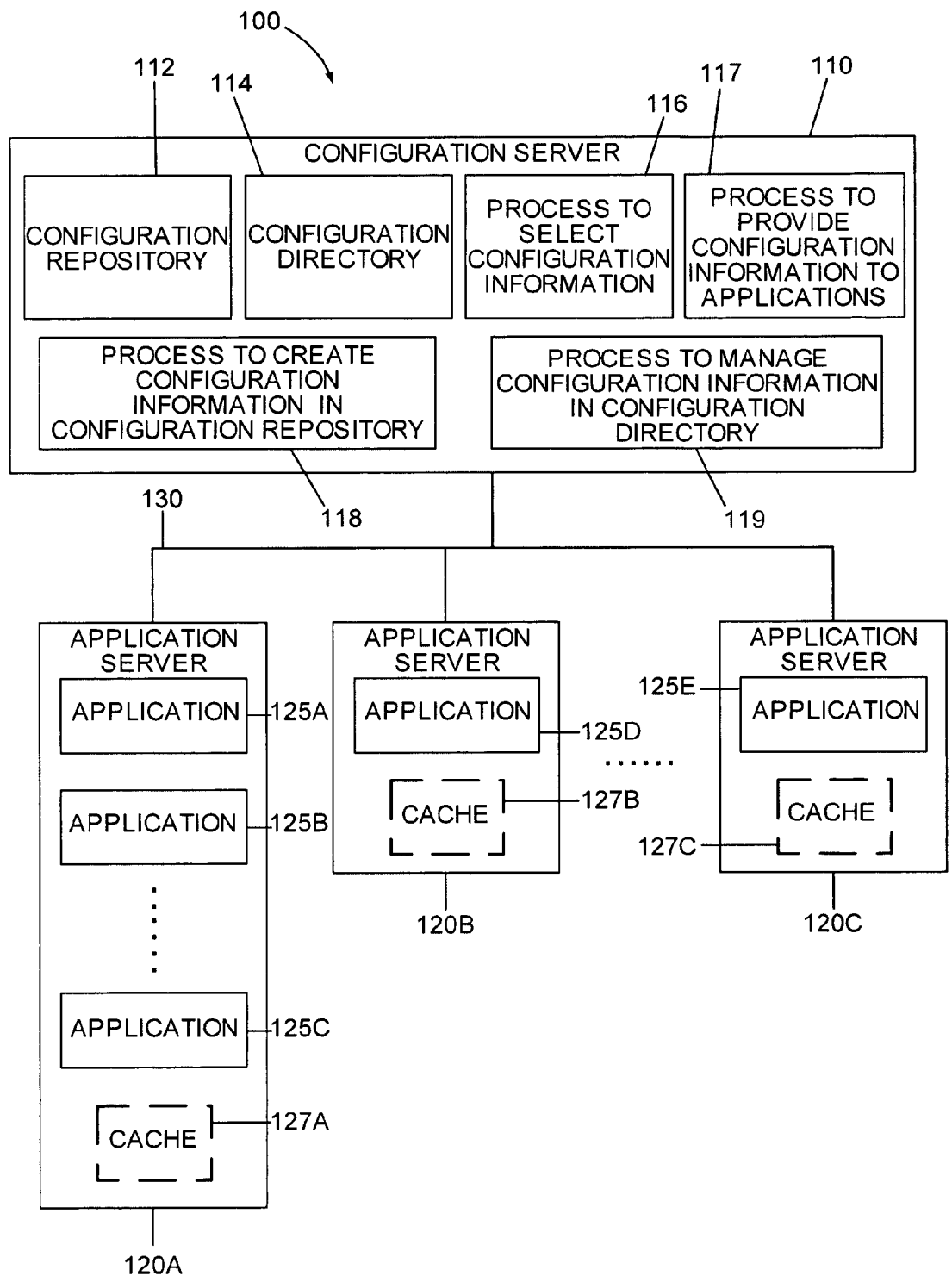
FIGS. 1 and 5 are block diagrams of systems for centrally storing and distributing configuration information to be used by one or more applications.

FIG. 1 illustrates an enterprise application system 100 that includes a configuration server 110 in accordance with the invention. In general, the configuration server 110 includes a configuration repository 112 that includes a wide-range of configuration information for possible use by an application program or a component thereof (collectively "application") and from which a portion is selected for inclusion in a configuration directory 114 prior to deployment and/or installation of the configuration server and/or one or more of the applications 125A-125E. The configuration directory 114 includes configuration information accessible to and used by the application components at runtime. More particularly, the configuration server 110 sends configuration information to one or more application servers 120A-120C on which one or more applications 125A-125E run. The applications 125A-125E use the received configuration information.

In one example implementation, each of the multiple applications 125A-125E may perform different business functions. For example, application 125A may be a human resources application program, application 125C may be a financial application program, and application 125E may be a supply chain management application program. The applications 125A-125E may be located in a single facility, such as a computer or data center or a single business location.

In another example implementation, each of the multiple applications 125A, 125D and 125E may be multiple instances of the same application program, each of which is located in a separate facility. In this case, each of the multiple applications 125A, 125D and 125E may access different configuration servers 110, each of which may be located at or near the facilities having the application. However, for purposes of illustrating that multiple instances of the same application across multiple installations may use different configuration information from the same configuration repository 112, the multiple applications are shown accessing the same configuration server 110. Using multiple configuration servers may speed access to the configuration information for the multiple applications and may simplify error recovery.

The configuration server 110 is connected to the application servers 120A-120C with a communications link 130. The communications link 130 typically makes a direct or indirect connection between the configuration server 110 and the application servers 120A-120C. When the configuration server 110 and the application servers 120A-120C are in substantially the same location, then the communications link 130 may represent a direct connection between the configuration server 110 and the application servers 120A-120C. When the configuration server 110 and the application servers 120A-120C are not in substantially the same location, the communications link 130 may include the Internet, the World Wide Web, wide area networks (WANs), local area networks (LANs), analog or digital wired and wireless telephone networks (e.g., public switched telephone network (PSTN), integrated services digital network (ISDN), and various digital subscriber line (DSL) protocols), radio, television, cable, satellite, and/or any other delivery mechanism for carrying data. The configuration server 110 and the application servers 120A-120C may be connected to the communications link 130 through communication pathways (not shown) that enable communications through the communications link 130 described above. Each of the communication pathways may include, for example, a wired, wireless, cable or satellite communication pathway.

The configuration repository 112 stores a wide-variety of configuration information that may be selected prior to deployment and subsequently used through the configuration directory 114 by the applications 125A-125E during runtime. In some implementations, the configuration repository 112 may store all, or substantially all, of the configuration information used by the applications 125A-125E. In other cases, the configuration information in the configuration repository 112 may need to be sufficient for all of the applications 125A-125E and may need to be supplemented by additional information, as described later. Configuration information includes configuration parameters and settings for the configuration parameters. Configuration information also may include meta-data about configuration parameters and settings. Configuration meta-data may include, for example, constraints related to configuration parameters and classification information related to configuration parameters. The data stored in the configuration repository 112 only needs to be specified once, regardless of the number of applications 125A-125E that may use the configuration information. In one implementation, the configuration information and meta-data is stored in the configuration repository 112 using an extensible markup language (XML) format. In another implementation, the configuration information is stored in the configuration repository 112 in another format, such as a data table for a relational database or a data object for an object-oriented database.

The configuration information stored in the configuration repository 112 may be classified in various ways, such as by industry, country, or business process scenario, to help a user select the appropriate configuration information for use by the applications 125a-125e in the customer's installation. The configuration information also may be classified as, for example, relating to master data or business process data. In contrast to configuration data, master data refers to data that are created, revised or deleted by one or more of the applications 125A-125E. Often, a master data object refers to a principal entity used in one or more of the applications 125A-125E. Examples of master data objects include, but are not limited to, a sales order object, a product object, an employee object, a customer object, or a business partner object. Configuration information that relates to business process data, on the other hand, may be used to control how the applications 125A-125E function. One example of configuration information that relates to a business process is whether a particular step in a sales order process is performed before or after another step in the sales order process. Another example of such configuration information is whether a particular data validation function is performed during a particular business process. Another example of configuration information relating to an accounts payable business processes is configuration information that identifies the frequency and amount of recurring payments to be made as part of a business process in a financial management application. More particularly, configuration information in such a context may specify payment terms, dunning procedure, and pricing conditions.

The configuration directory 114 includes current configuration information for how the applications 125A-125E are to be configured. The configuration directory 114 is accessed at runtime to provide configuration information to the applications 125A-125E. The configuration directory 114 stores the configuration information that has been chosen from the configuration repository 112 for use by the applications 125A-125E when the configuration server 110 and/or one or more applications 125A-125E are installed or deployed. The configuration directory 114 may also store configuration information that has been created or revised by a system administrator or other type of user, as described more fully later. In addition, the configuration directory 114 may be organized to help optimize storage of the configuration information for runtime access by the applications 125A-125E. In one implementation, the configuration information in the configuration directory 114 is represented in database tables for performance and access efficiency, whereas configuration information in the configuration repository 112 is stored in XML format.

The configuration server 110 uses various techniques to improve performance of the enterprise application system 100. The configuration server 110 may use buffering and/or caching to speed access to configuration information stored in the configuration directory 114 upon subsequent accesses. In one implementation, each of the application servers 120A-120C includes a cache 127A-127C of configuration information. Configuration information may be stored in the caches 127A-127C after one of applications 125A-125E running on one of the application servers 120A-120C receives the information from the configuration server 110. Caching configuration information on the application servers 120A-120C in the caches 127A-127C may prevent the applications 125A-125E running on the application servers 120A-120C from later having to access the configuration server 110 for the same configuration information. Instead, the applications 125A-125E may retrieve the configuration information from the caches 127A-127C, which may be faster than receiving the configuration information from the configuration server 110. Conventional cache replacement policies and cache consistency protocols may be used to help ensure that the configuration information stored in the caches 127A-127C match the configuration information stored on the configuration server 110 in the configuration directory 114.

In another example, the configuration information may be stored in the configuration directory 114 as runtime database tables from which access is generally faster than XML files. In addition, separating the configuration information applicable to the enterprise application system 100 in the configuration directory 114 from the selectable configuration information in the configuration repository 112 also may speed access to the desired configuration information by one of the applications 125A-125E.

The configuration server 110 also includes a process 116 to select configuration information for use at runtime and a process 117 to provide configuration information to applications. The process 116 to select configuration information facilitates the selection and subsequent transfer of portions of configuration information from the configuration repository 112 to the configuration directory 114 for use by the applications 125A-125E at runtime. The process 116 also may be described as a build or activation service whereby configuration information is activated from the configuration repository 112 for use by the applications 125A-125E at runtime. The process 116 may be performed when one of the configuration server 110, application servers 120A-120C, and applications 120A-120E are being installed, deployed, or upgraded. More particularly, the process 116 generally is manually initiated by a system administrator or a business analyst and is performed by a processor on the configuration server 110 executing a method, module, script, function, or other type of computer program.

The process 117 provides configuration information from the configuration directory 110 to the application servers 120A-120C when needed by the applications 125A-125E at runtime. In one implementation, the process 117 provides the applications 125A-125E with configuration information in response to requests from the applications 125A-125E for configuration information. In another implementation, the process 117 provides the applications 125A-125E with configuration information in response to detection that the applications 125A-125E have started. The process 117 may use synchronous or asynchronous messaging to deliver the configuration information to the applications 125A-125E. The process 117 may employ a middleware messaging system to deliver the configuration information to the applications 125A-125E. The process 117 is performed by the configuration server 110 when configuration information is needed by the applications 125A-125E. More particularly, the process 117 is performed by a processor on the configuration server 110 executing a method, module, script, function, or other type of computer program.

In some implementations, the configuration server 110 also includes a process 118 to create configuration information in the configuration repository 112. The process 118 also may be referred to as an authoring tool. The ability of a user to create configuration information for addition to the configuration repository 112 may be particularly useful when a third-party integration entity is involved in implementing and/or customizing a commercial application for use by multiple customer entities each of whom purchase the commercial application. For example, a third-party integration entity may create and revise configuration data related to a particular industry or market segment for use by multiple customers involved in the industry or market segment.

The configuration server 110 also may include a process 119 to manage configuration information in the configuration directory 114. The management of configuration information includes creating, revising and deleting configuration information. The process 119 enables a user to add, customize, refine or otherwise modify the configuration information in the configuration directory 114. This may be particularly useful when the configuration repository 112 does not contain all of the configuration information needed by an application.

In some implementations, the enterprise application system 100 may be implemented as a fully centralized deployment in which each of the application servers 120A-120C and the configuration server 110 are located at the same facility, such as a central computer or data center. The enterprise application system 100 also may be implemented as in a partially decentralized deployment, which also may be referred to as a partially centralized deployment, in which some of the application servers 120A-120C are located in a different facilities. In such a case, the configuration server 110 may be connected to some of the application servers 120A-120C using a wide-area network or other type of communication link able to transmit data to the application servers 120A-120C. Alternatively or additionally, there may be multiple configuration servers 110 for the enterprise application system 100 such that a configuration server 110 is located in each facility.

Separating the configuration information from the applications 125A-125E enables selection and specification of the configuration information in the configuration directory 114 one time for all of the applications 125A-125E that use the configuration information. Because the configuration information is stored and specified once, the complexity and operating costs of the enterprise application system 100 may be reduced, perhaps, substantially reduced. In addition, while the enterprise application system 100 is being deployed, only the configuration server 110 and none of the applications 125A-125E need to be configured. More particularly, the applications 125A-125E are operable to request and/or receive configuration information from the configuration server 110. The configuration information that is needed from the configuration server 110 is known and specified in the applications 125A-125E at design time. Only the configuration server 110 needs to be configured to provide appropriate configuration information to the applications 125A-125E. For the same reason, the applications 125A-125E may be more easily exchanged, replaced or upgraded in the enterprise application system 100 when configuration information is separated from the applications 125A-125E than when configuration is not centrally stored. Because no configuration information is specified within the applications 125A-125E, upgrading the applications 125A-125E only includes replacing a prior version of one of the applications 125A-125E with an upgraded version that are enabled to use configuration information from the configuration server 110.

Figure 2:
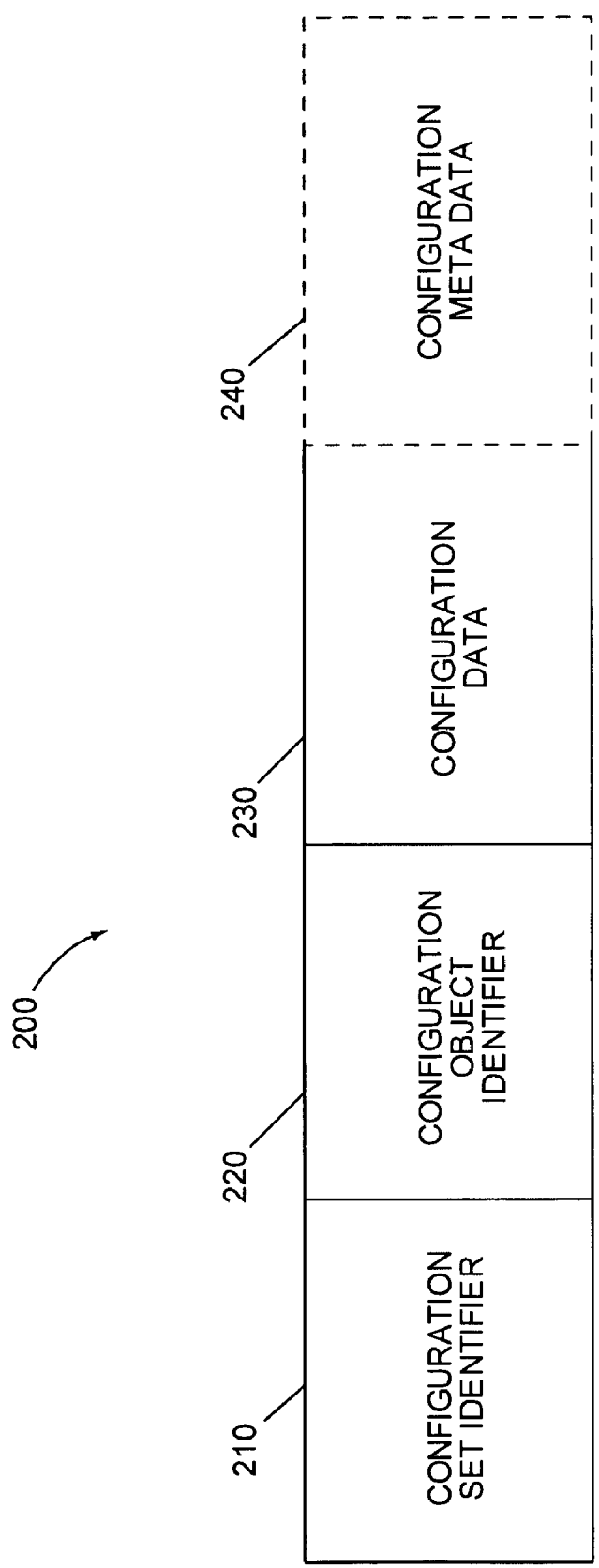
FIG. 2 is a block diagram of an example of a data structure for configuration information.

Before discussing the additional detail regarding the method by configuration information is selected from a configuration repository or provided to an application, it is first helpful to describe an example format that may be used for configuration information. Referring to FIG. 2, an example data structure 200 is shown, in simplified form. In FIG. 2, the data structure 200 for configuration information includes, for each configuration information entry, a configuration set identifier 210, a configuration object identifier 220, configuration data 230, and, optionally, configuration meta-data 240. The configuration information stored in the data structure 200 may be, for example, an implementation of configuration information stored in the configuration repository 112, the configuration directory 114, or both the configuration repository 112 and the configuration directory 114. In the example of FIG. 2, each entry stored using the data structure 200 represents an configuration object, which may be requested by an application.

The configuration set identifier 210 identifies a group of configuration objects. The configuration object identifier 220 uniquely identifies a particular configuration object or entry. Configuration objects may be grouped into configuration sets based on a shared characteristic or use in a common business process. In one example, a configuration set may include configuration objects that provide configuration information relevant to an application being used in a particular country. In another example, a configuration set may include configuration objects that provide configuration information related to a particular business process, such as account payment business process. In yet another example, a configuration set may include configuration objects that provide configuration information in a narrower context, such as a configuration set that provides configuration objects related to the processing of, and payment for, manufactured goods sold in a particular country. In some implementations, a configuration set may be hierarchical in nature such that one set of configuration information is related to another set of configuration information, as described more fully later. Additionally or alternatively, in some implementations, a configuration object may be related to more than one configuration set or manner of classification. Thus, a configuration object may be classified as relating to a particular country and one or more particular business processes. The configuration set identifier also may be referred to as a configuration object set identifier.

The configuration data 230 includes configuration parameters and settings included in the configuration object. In contrast, the configuration meta-data 240 includes information about the configuration data 230. One example of configuration meta-data 240 is a constraint about the configuration data 230, such as restricting the modification of an attribute in the configuration data 230.

As would be understood by one skilled in the art, a variety of data structures may be used to store configuration information. For example, in one implementation, classification information about a particular configuration object may be stored in configuration meta-data 240, whereas another implementation may use a configuration set identifier 220 to reflect the same or substantially similar classification information.

Figure 3:
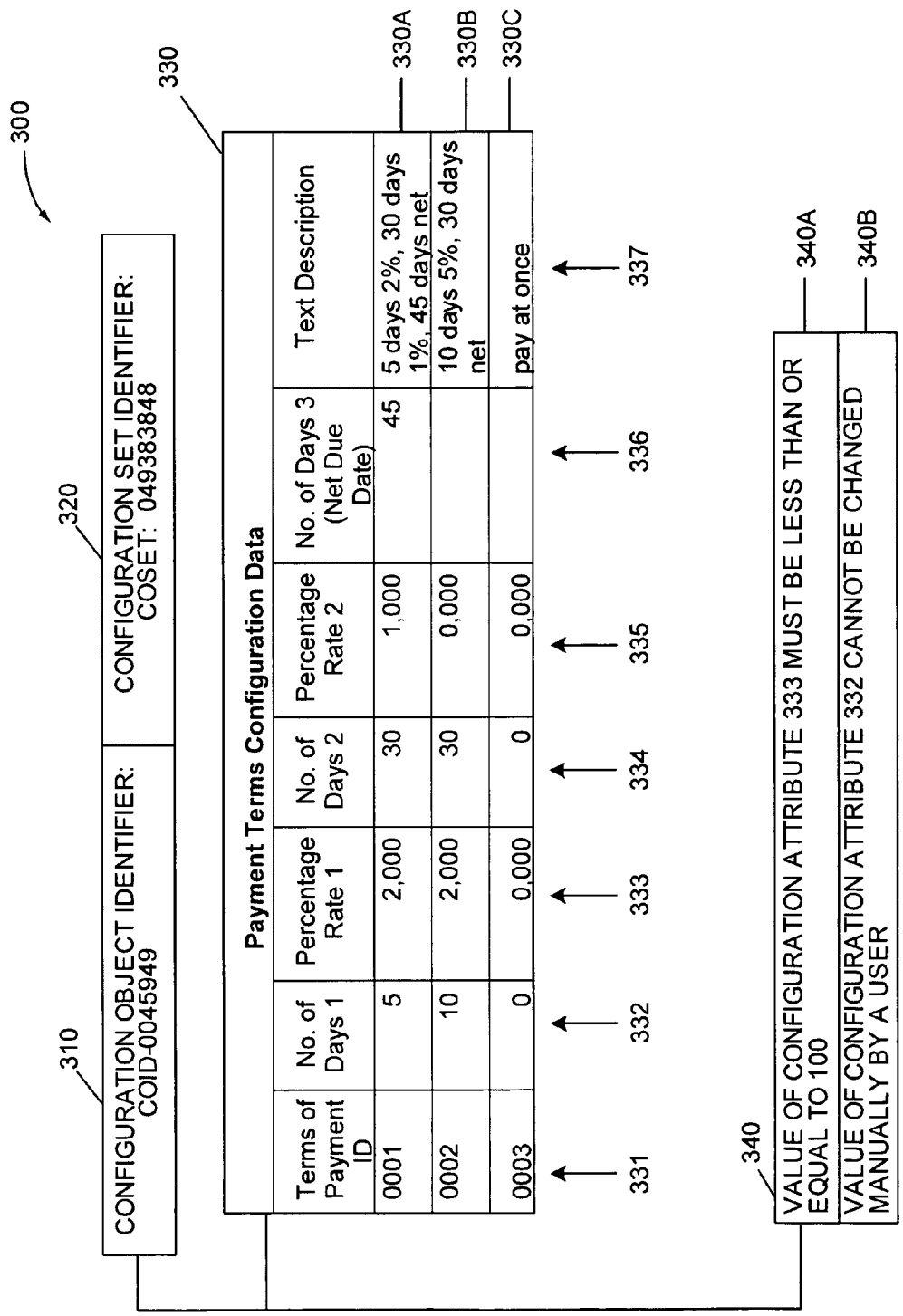
FIG. 3 is an example of configuration information that is centrally stored for use by one or more applications.

FIG. 3 shows an example of configuration information 300 that may be used by the applications which are able to access a configuration server storing such configuration information. In one example, applications 125A-125E that run on the application servers 120A-120C that are connected to a configuration server 110 in FIG. 1 may use the configuration information 300. The illustrated configuration information 300 is for a configuration object having configuration information related to payment terms used in an financial or sales application. The configuration information 300 includes a configuration object identifier 310 and a configuration set identifier, such as those described previously in FIG. 2.

The configuration information 300 also includes configuration data 330 that identifies multiple sets of payment term configuration data that describe alternate sets of payment terms that may be offered to customers that purchase products from a business enterprise. More particularly, the payment-term configuration data 330 includes columns of parameters 331-337 and rows of payment term data 330A-330C, each of which may be stored and specified on the configuration server 110. Each row of payment term data, 330A, 330B or 330C, represents a payment term configuration that may be used by an application. The parameters 331-337 represent the configuration attributes that may be used to define a particular payment term configuration. More particularly, the parameters include the terms-of-payment identifier (ID) 331 that uniquely identify a payment term configuration (e.g., a row in this example). The parameters also include the number of days 332 and percentage rate 333 of a first payment period in which a first discount is valid, the number of days 334 and percentage rate 335 of a second payment period in which a second discount is valid, and a time limit 336 for payment (e.g., a net due date). The parameters also include a text description reflecting the payment terms of the particular payment term configuration. In one example, the payment term configuration 330A includes a parameter 332 having a setting of 5. A parameter also may be referred to as a configuration attribute, and a setting may be referred to as a configuration value or a configuration attribute value.

The configuration information 300 also includes configuration meta-data 340. Here, two constraints 340A and 340B are identified. Each of the constraints 340A and 340B must be met by one of the parameters 331-337 of the configuration data.

Referring also to FIG. 4, an example of a customer record 400 for an application that uses a payment term configuration in FIG. 3. The customer record 400 is part of the application data and uses payment term configuration information provided to the application by the configuration directory. The customer record 400 is not included in the configuration directory. The customer record 400 includes an indication 410 of a payment term configuration that is generally used for a customer and an indication 420 of a standard currency type used for the customer.

The customer record 400 includes information about sales orders 430 that have been placed by a customer and processed by an application accessing payment-term configuration information from a configuration server. In particular, the customer record 400 includes information about two sales orders 430A and 430B. Each of the sales orders 430A and 430B includes a sales order number 432, an amount 434 of the sales order, an indication 436 of the payment term configuration that applies to the sales order, and an indication 438 of the time that the customer paid the sales order (as measured by the number of days after the sale when payment was made).

In the example of FIG. 4, the sales order 430A used the payment term configuration 330B of the payment term configuration information 300 in FIG. 3. This is shown by the indication 436 of the payment term configuration in row 430A having a value of "0002," which matches the terms-of-payment identifier 331 of row 330B in FIG. 2. Thus, the payment terms of row 330B apply to the sales order 430A. Similarly, the sales order 430B used the payment term configuration 330A of the payment term configuration information 300 in FIG. 3. This is shown by the indication 436 of the payment term configuration in row 430B having a value of "0001," which matches the terms-of-payment identifier 331 of row 330A in FIG. 2. Thus, the payment terms of row 330A apply to the sales order 430B.

Figure 5:
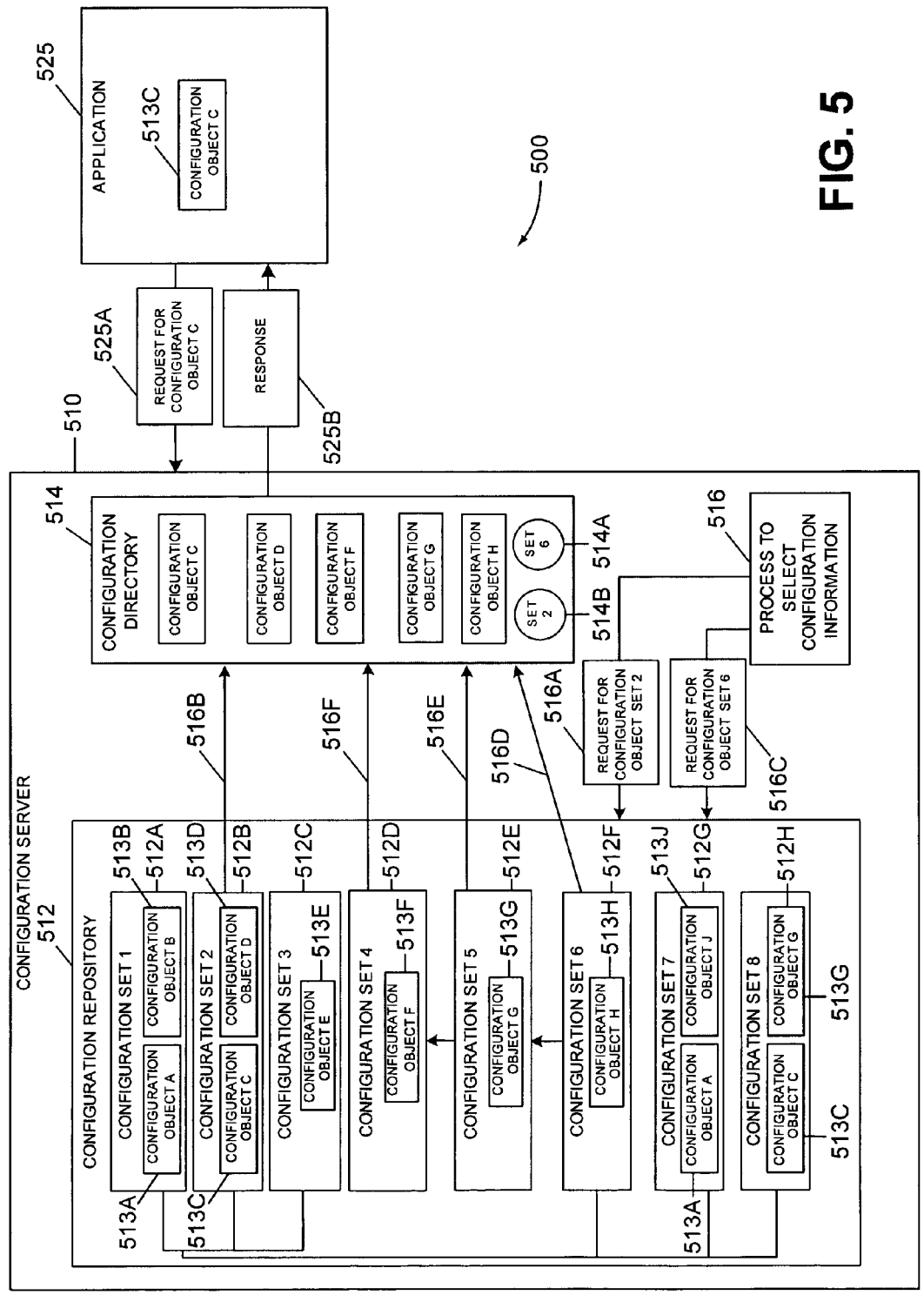

FIG. 5 is an example of a enterprise application system 500 having a configuration server 510 from which multiple sets of configuration information are chosen for use by an application 525. The configuration server 510 may be an implementation of the configuration server 110 in FIG. 1, and the application 525 may be an implementation of one of the applications 125A-125E in FIG. 1.

In the example of FIG. 5, a configuration repository 512 stores a collection of configuration sets 512A-512H, each of which includes one or more configuration objects 513A-513J having configuration data and configuration meta-data. A configuration object may be, for example, a configuration object for payment terms, such as the configuration information 300 illustrated in FIG. 3.

Some of the configuration sets in the configuration repository 512 are dependent on other configuration sets. For example, configuration set 512F is dependent on configuration set 512E, which, in turn, is dependent on configuration set 512D. In order words, configuration set 512D is a prerequisite for configuration set 512F, which, in turn, is a prerequisite for configuration set 512F. Thus, taking advantage of the hierarchical relationship between the configuration sets 512D-512F, the configuration set 512F need only include the configuration objects that are not included in configuration set 512E or 512D. As shown, the configuration set 512F includes only configuration object 513H. When a user selects the configuration set 512F, the configuration objects 513F-513H are provided to the configuration directory 514, as described more fully later.

The configurations sets 512A-512C are mutually exclusive. Thus, at most one of the configuration sets 512A-512C may be selected for use by the application 525. In contrast, one or more of the configuration sets 512F-512H may be selected for use by the application 525.

Also, as shown in the example of FIG. 5, a configuration object may be included in more than one configuration set. In particular, configuration object 513A is included in configuration set 512A and configuration set 512G. The configuration sets 512A and 512G may be said to overlap. Similarly, configuration object 513C is included in configuration set 512B and configuration set 512H. When a user selects multiple configuration sets that include the same configuration object, the configuration information may be merged such that the configuration directory only includes one of any particular configuration object. For example, if a user selects both configuration sets 512B and 512H, the configuration directory includes configuration objects 513C, 513D and 513G (and does not include a second copy of configuration object 513C).

As shown by FIG. 5, the configuration directory 514 includes configuration objects 513C, 513D, 513F, 513G and 513H, which were indirectly selected when a user selected the configuration sets 512B and 512F from the configuration repository 510. More particularly, the configuration directory 514 includes the configuration objects 513C and 513D because, in response to the user selection of configuration set 512B, the process 516 sent a request 516A to the configuration repository 512, which provided the configuration objects 513C and 513D to the configuration directory 514, as shown by the arrow 516B. The configuration directory 514 also includes the configuration objects 513F-513H based on the selection of configuration set 512F by a user and the hierarchical relationship between the configuration sets 512D-512F in the configuration repository 512. More particularly, in response to user selection, the process 516 sends a request 516C to the configuration repository 512 for the configuration object set 512F. The configuration repository 512 sends to the configuration directory 514 the configuration object 513H that is included in the configuration set 512F, as shown by the arrow 516D. The configuration repository 512 also sends, based on the hierarchical relationship between configuration set 512F and configuration set 512E, the configuration object 513G that is included in the configuration set 512F, as shown by the arrow 516E. In addition, the configuration repository 512 sends, based on the hierarchical relationship between configuration set 512E and configuration set 512D, the configuration object 513F that is included in the configuration set 512D, as shown by the arrow 516F.

In some implementations, the information related to the configuration objects 513A-513J in the configuration repository 512 is stored in a different form than the form of the configuration objects 513C, 513D, 513F, 513G and 513H stored in the configuration directory 514.

In the example of FIG. 5, the configuration directory 514 also includes references 514A and 514B to the configuration sets 512B and 512F that were selected by the user for inclusion in the configuration directory 514. The references 514A and 514B may help to provide traceability to the configuration sets that were selected from the configuration repository and may be useful when configuration information changes are made in the configuration repository.

In operation at runtime, the application 525 requests from the configuration server 510 a configuration object (here, configuration object 513C), as shown by request 525A. The configuration server 510 accesses the configuration set 514A and provides the requested configuration information to the application, as indicated by response 520B. The application receives the requested configuration information 513C for use during the execution of the application. This may be accomplished, for example, by the application accessing an application program interface (API) to obtain a particular configuration object.

For brevity, the configuration object sets 512A-512H each illustrate only one or two configuration objects. However, actual implementations may include many configuration objects in a configuration set.

Figure 6:
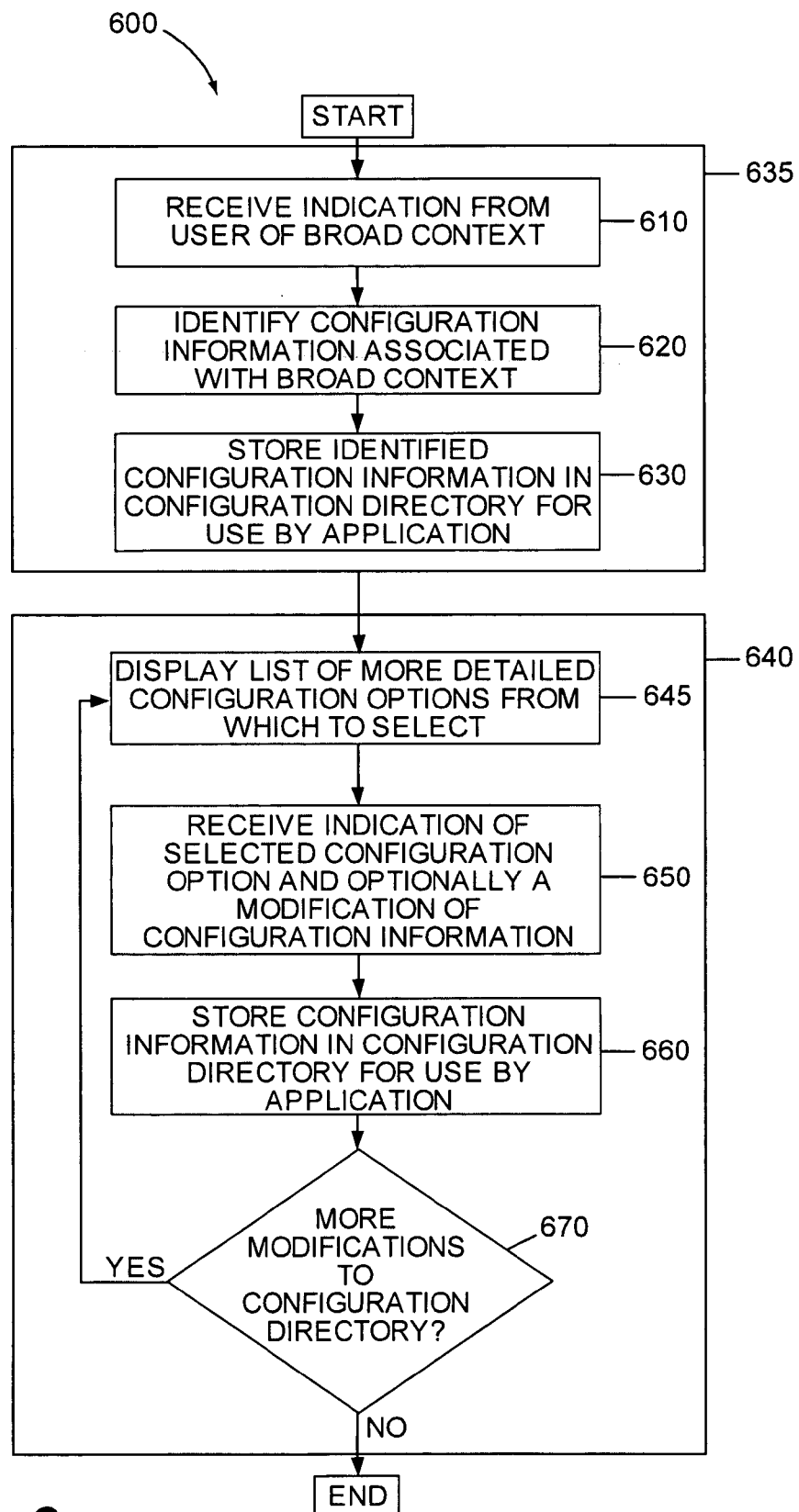
FIG. 6 is a flow chart of a process for specifying centrally stored configuration information to be used by one or more applications.

FIG. 6 illustrates a process 600 that is used to select configuration information from a configuration repository and to store the configuration information in a configuration directory. The process 600 may occur when a configuration server 110 is installed, deployed or upgraded. The process 600 also may occur when one or more applications that access the configuration information from the configuration server are installed, deployed, upgraded or customized. The process 200 is performed by a processor in the configuration server when initiated by a user, such as a business analyst or a system administrator. More particularly, the process 200 is performed by a processor executing a method, module, script, function, or other type of computer program, such as the process 116 from FIG. 1. In general, during the process 200, a user enters inputs to direct the configuration server in the selection of the configuration information from a configuration repository.

The configuration server receives an indication from the user of a broad context in which the application or applications operate (which, collectively, may be referred to as a "solution") (step 610). For example, the indication may indicate one or more geographic locations, such as a country or geographical region, and an industry in which the solution operates. The indication may be received based on a user's response to prompts about the context in which the solution is to operate. An example of such a prompt is a display in which countries and/or geographic locations are presented from which a user may select. Another example of a prompt is a list of industries from which the user may select.

The configuration server then identifies, in the configuration repository, configuration information associated with the broad context as identified by the received indication (step 620) and stores the identified configuration information in the configuration directory for use by the solution (step 630). Steps 610-630 may be referred to as a sub-process 635 to activate or build the configuration directory.

The process 600 continues with a sub-process 640 in which a user may iteratively identify additional configuration information to be selected from the configuration repository for storage in the configuration directory. More particularly, the configuration server displays a list of more detailed configuration options from which the user may select (step 645). The detailed configuration options may relate to particular business process scenarios or groups of scenarios. In some implementations, the configuration information associated with a particular configuration option may be displayed and the user may be allowed to modify the configuration information associated with a selected configuration option.

The configuration server then receives an indication of the selected configuration option and, optionally, a modification of the configuration information associated with a selected option (step 650). The configuration server stores the configuration information associated with the selected option in the configuration directory for use by the solution (step 660).

The user is permitted to continue to identify additional modifications to the configuration directory (steps 645-660) until the user has completed all desired modifications (step 670). The process 600 then ends.

In one implementation of process 600, a user is asked to respond to a series of prompts that progress from more general to more specific to define the solution context. For example, a user may first be asked to identify the geographic location and industry. The user then may be asked to identify which of many business scenarios or processes are to be available in the solution (e.g., supported by the application and used by the business enterprise installing the solution). Examples of business processes or scenarios for which configuration information may be selected include scenarios for particular sales contexts, such as telephone sales, electronic commerce sales (e.g., sales conducted using computer systems communicating over a network, such as the Internet), procure from stock, or sell from stock. Based on the user's responses, the configuration server identifies configuration information from the configuration repository that are to be stored in the configuration directory. In addition, in some implementations, a user may add or modify the configuration information in the configuration directory, such as by using process 119 in FIG. 1.

Figure 7:
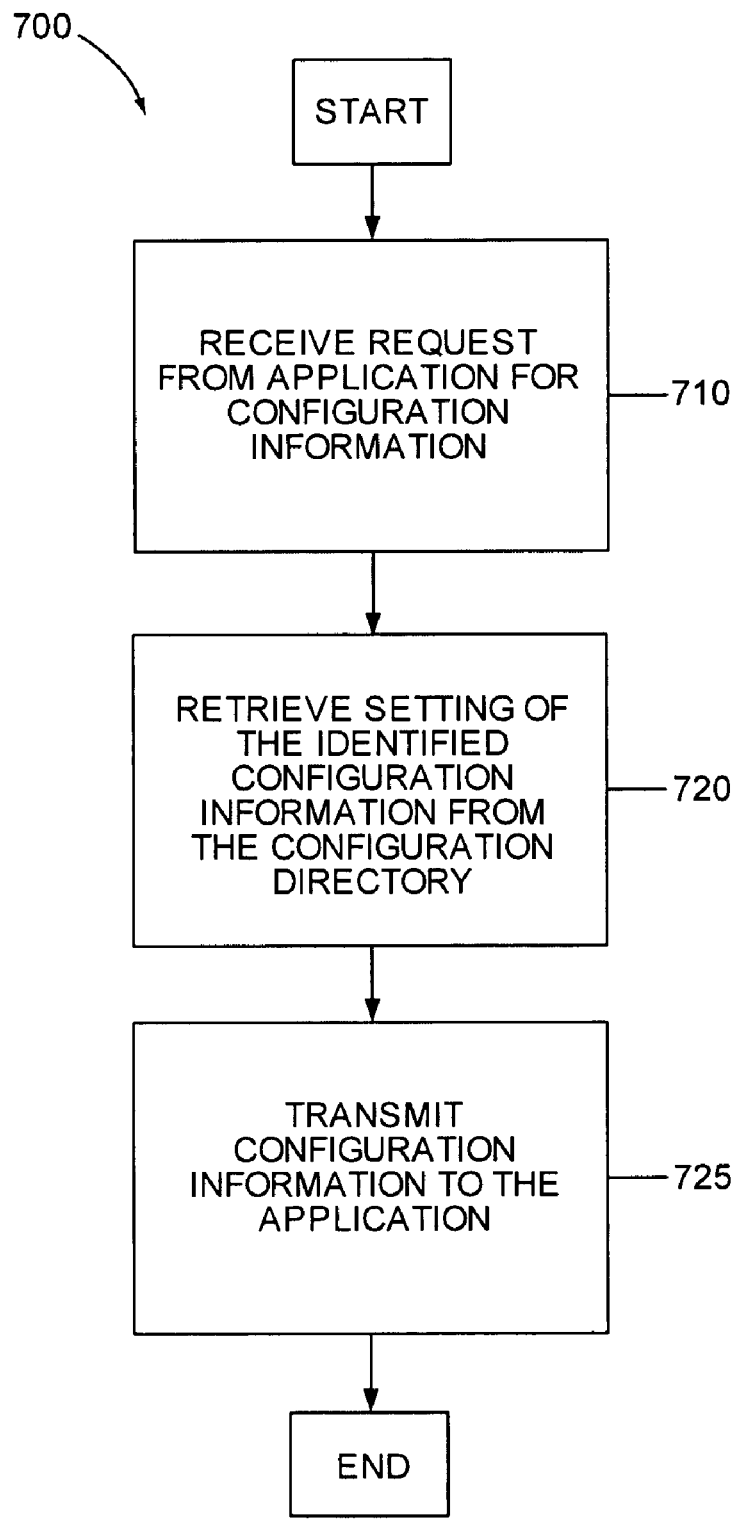
FIGS. 7, 8A and 8B are diagrams of processes for accessing centrally stored configuration information to be used by one or more applications.

FIG. 7 illustrates a process 700 that is performed by a configuration server to provide an application running on an application server, to which the configuration server is connected, with configuration information necessary for the operation of the application. The process 700 occurs at runtime of an application when the configuration server 110 provides configuration information to an application. The process 700 is performed by a processor in the configuration server. More particularly, the process 700 is performed by a method, module, script, function, or other type of computer program, such as the process 117 in FIG. 1.

The process 700 begins when the configuration server receives a request from an application for configuration information (step 710). The identified configuration information is retrieved from the configuration directory (step 720) and transmitted the configuration information to the application (step 725). In one implementation, a middleware messaging system may be used to transmit the configuration information to the application. The configuration information may be used throughout execution of the application. The process 700 then ends.

Alternatively, the configuration server may package individual sets of configuration information and separately transmit the individual sets of configuration information.

Figure 8A:
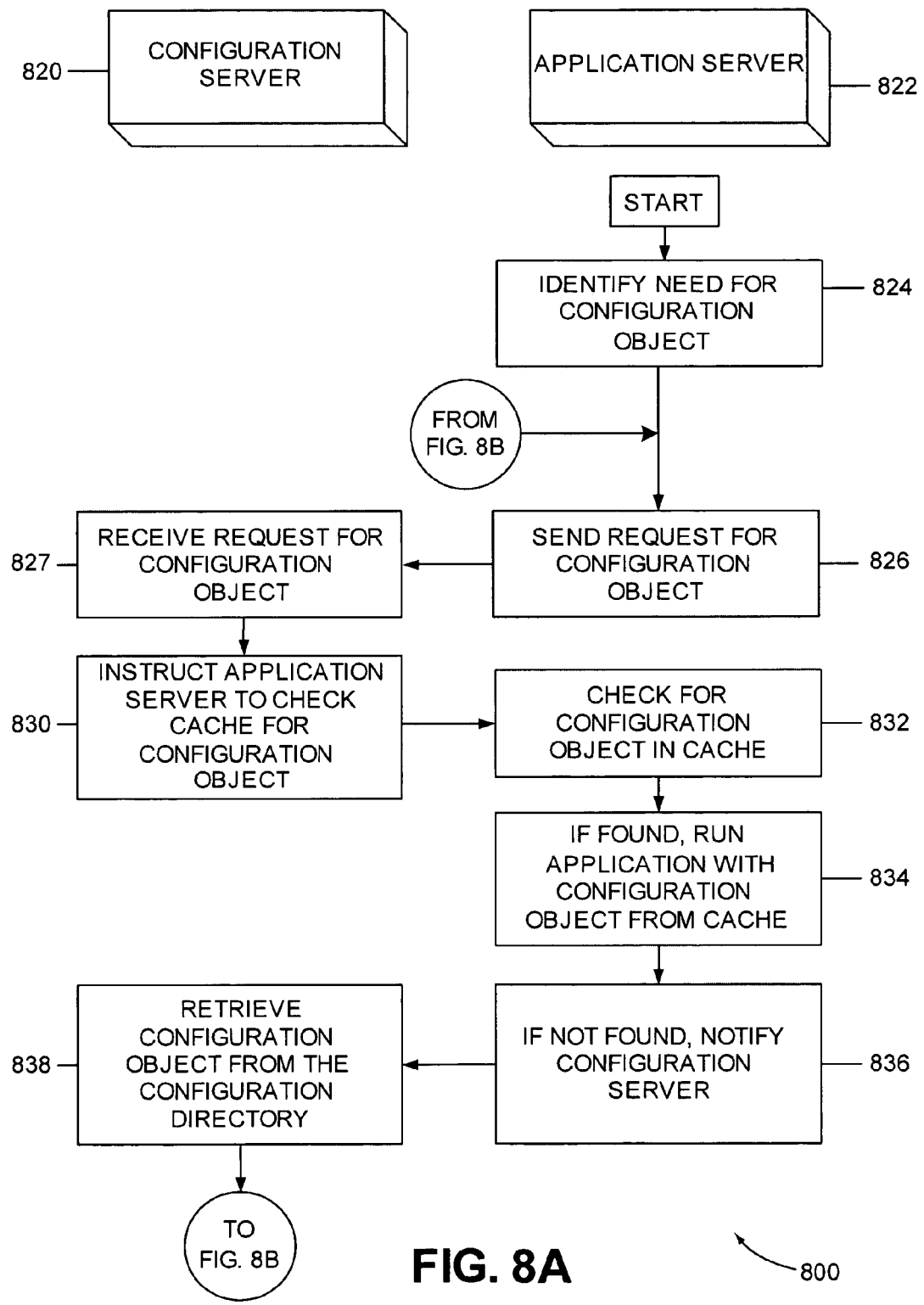
Figure 8B:
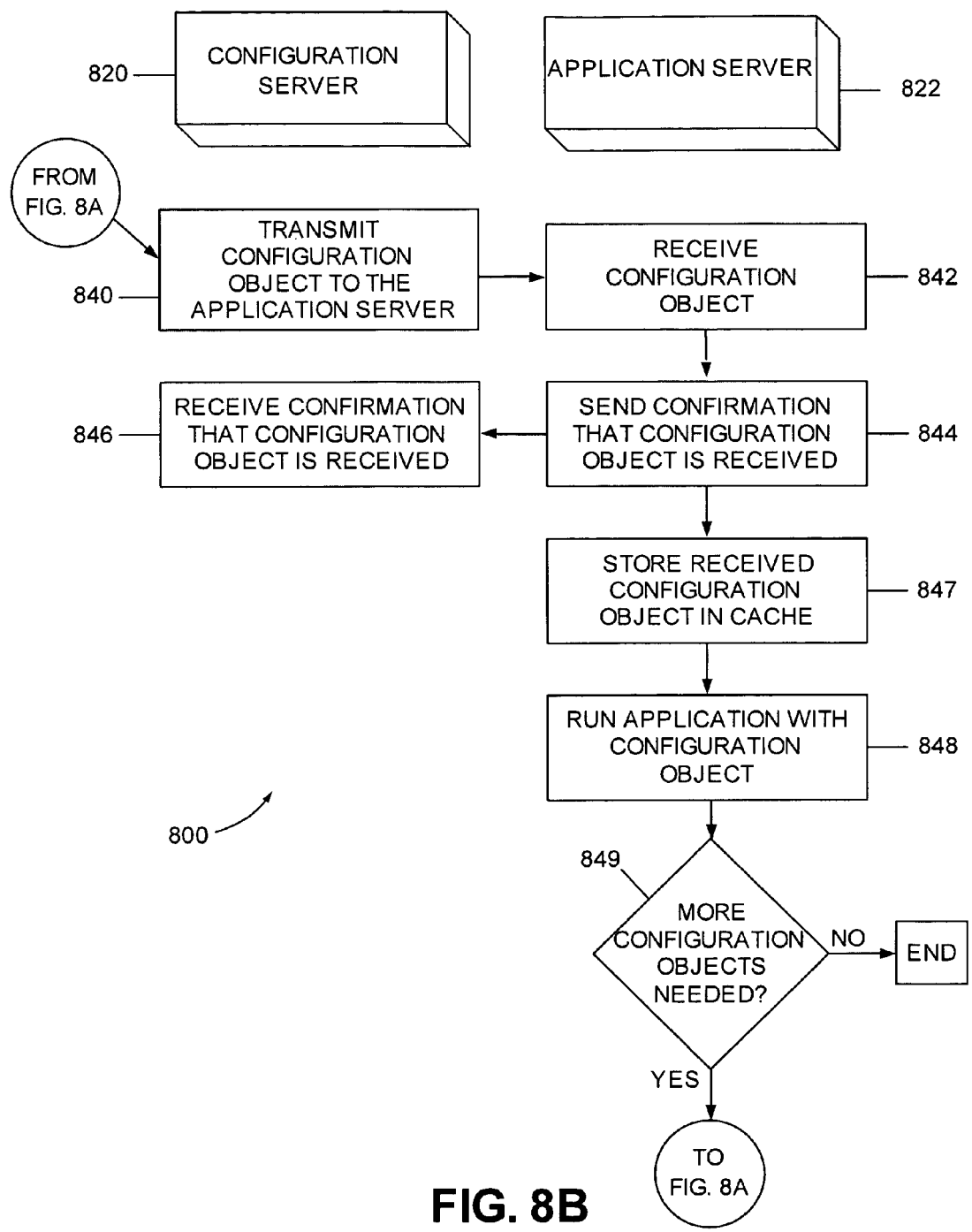

FIGS. 8A and 8B illustrate a process 800 for accessing centrally stored configuration information to be used by one or more applications at runtime. The configuration information is stored as configuration objects in a configuration directory. The process 800 occurs between a configuration server 820 and an application server 822 that is directly or indirectly connected to the configuration server 820. During the process 800, the configuration server 820 transmits configuration objects needed by an application running on the application server 822.

The process 800 begins when an application on the application server 822 identifies its need for a configuration object (step 824). Generally, though not necessarily, this may occur when an application is started. The application 822 sends, to the configuration server 820, a request for a configuration object (step 826). The configuration server 820 receives the request for a configuration object (step 827) and instructs the application server 822 to check a cache of configuration objects on the application server 822 for the configuration object (step 830). Instructing the application server may include sending a signal to the application server indicating that the cache should be checked for the configuration object. The application server 822 then checks for the identified configuration object in the cache (step 832). If the configuration object is found, then the application server 822 runs the application with the configuration object found in the cache (step 834).

When the configuration object is not found in the cache, then the application server 822 notifies the configuration server 110 that the configuration object was not found (step 836). Notifying the configuration server 820 may include sending a signal to the configuration server 820 indicating that the configuration object was not found in the cache. The configuration server 820 then retrieves the configuration object from the configuration directory (step 838) and transmits the configuration object to the application server 822 (step 840). The application server 822 receives the configuration object and passes the configuration object to application (step 842). The application server 822 sends a confirmation that the configuration object has been received (step 844), and the configuration server 820 receives the confirmation (step 846). The application server 822 also stores the configuration object within the cache for later access (step 847), thereby preventing the need for configuration object to be sent to the application server 820 again during the application session. The application server 822 then runs the application with the received configuration object for the duration of the application session (step 848).

When the application determines another configuration object is needed (step 849), the application sends a request for another configuration object to the configuration server (step 826) and the process continues as described previously. Thus, in the example of process 800, all configuration objects need not necessarily be sent to the application at the same time when execution of the application first begins. Instead, the configuration server 820 sends the application configuration objects as requested. Consequently, the application may run when some, but not all, of the settings for the configuration parameters have been provided by the configuration server.

Alternatively or additionally, an application may specify all configuration objects needed by the application in a single request. In that case, the configuration server 820 may send all of the configuration objects to the application at substantially the same time, although the configuration objects may be sent in individual messages.

In yet another implementation, the application may send a general request for configuration information needed by the application. In such a case, the configuration server 820 determines whether which configuration objects are needed by the application. This may be accomplished, for example by accessing a table, list or other type of data store having associations of applications and parameters to determine if any parameters that are needed by the application have not been transmitted to the application server. The identified configuration objects are accessed and transmitted to the application server for use by the application.

In some implementations, the application 822 may check for the configuration object in the application cache prior to sending a request for the configuration object from the configuration server 820. In such a case, the configuration server 820 need not instruct the application 822 to check for the configuration object in cache before sending the configuration object to the application The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the invention have been described. Nevertheless, it will be understood that various modifications may be made without departing from the spirit and scope of the invention. Accordingly, other implementations are within the scope of the following claims.

What is claimed is:

1. A computer system comprising:
a first computer comprising a storage device storing:
a configuration repository storing multiple entries of configuration information for a software application program, each entry designed for customizing the software application program for a specific situation and the software application program being designed to remotely request configuration information as needed, wherein each configuration information entry includes 1) a configuration component available to be requested for the software application program and 2) a configuration attribute and an associated attribute value that define terms for the software application program to apply to a business transaction of a business enterprise in the specific situation, wherein the configuration repository stores the multiple entries of configuration information in XML format, and
a configuration directory storing at least a first configuration information entry selected for the specific situation from among the multiple entries, the first configuration information entry selected based on a user input during a process to customize the software application program for use in the specific situation by a particular business enterprise, the configuration directory being remote from the software application program and different from the configuration repository, and the configuration directory storing the at least one configuration information entry in a database table format in which access to the first configuration information entry is faster than in the XML format;
a processing device, coupled to the storage device, for providing the first configuration information entry having the database table format from the configuration directory to the software application program in response to a request; and
a second computer that operates the software application program and that is outer to the first computer, the software application program being configured to send, from the second computer over a communications link to the first computer, the request for the first configuration information entry for use by the software application program to process the business transaction of the business enterprise.

2. The system of claim 1 wherein the second computer comprises a server having one or more input devices and one or more output devices, and a port through which user devices are served.

3. The system of claim 1 wherein the first computer comprises a server configured within a distributed system and having one or more input devices and one or more output devices, and a port through which at least one other server is served.

4. The system of claim 1 wherein the configuration information entries are organized in the configuration repository based on a particular type of industry being associated with a particular configuration information entry having a particular value.

5. The system of claim 1, wherein the storage device stores instructions that, when executed, cause a processor to:
receive the request for the first configuration information entry in the configuration repository,
access the indicated configuration information entry in the configuration repository, and
store the indicated configuration information entry in the configuration directory.

6. The system of claim 5 wherein the request for the first configuration information entry is received based on a particular type of industry being associated with the first configuration information entry.

7. The system of claim 1, wherein the first configuration information entry is selected based on a received indication of a configuration information set, which comprises an indication of a market segment that includes an indication of an industry.

8. The system of claim 7, wherein the indication of the configuration information set is received based on selections received from a user in response to progressive user prompts that progressively prompt the user for increasing detail about a market segment.

9. The system of claim 1, wherein each configuration information entry includes meta-information reflecting constraints on the configuration attribute and the associated attribute value.

10. The system of claim 1, wherein the configuration directory is configured to provide faster runtime access than the configuration repository.

11. The computer system of claim 1 wherein:
the configuration repository includes a first configuration set that is associated with the first configuration information entry and a second configuration set that is associated with a second configuration information entry that is different than the first configuration information entry,
the first configuration set and second configuration set have a hierarchical relationship;
the configuration directory stores the first configuration entry and the second configuration entry based on the hierarchical relationship of the first configuration set and the second configuration set.

12. The computer system of claim 11, wherein the configuration directory stores the first configuration entry and the second configuration entry based on a received indication of the first configuration set identified by user input during the process to customize the software application program.

13. The computer system of claim 1, wherein:
the configuration repository includes a first configuration set that is associated with a particular configuration information entry and a second configuration set that is associated with the particular configuration information entry associated with the first configuration set, and
the configuration directory includes the particular configuration information entry that is associated with both the first configuration set and the second configuration set.

14. A computer-readable medium, in a machine-readable storage device, storing a computer program product, the computer program product including instructions that, when executed, cause a configuration information handling component to perform operations comprising:
receiving an indication of at least a first configuration information entry at a first computer storing a configuration directory and a repository containing multiple entries of configuration information for a software application program, each entry designed for customizing the software application program for a specific situation and the software application program being designed to remotely request configuration information as needed, wherein each configuration information entry includes 1) a configuration component available to be requested for the software application program and 2) a configuration attribute and an associated attribute value that define terms for the software application program to apply to a business transaction of a business enterprise in the specific situation, wherein the configuration repository stores the multiple entries of configuration information in XML format;
activating a stored process on the first computer that converts the first configuration information entry from the XML format to a database table format in which access to the first configuration information entry is faster than in the XML format; and
storing the first configuration information entry in the configuration directory in the database table format, the configuration directory being remote from the software application program and different from the configuration repository, wherein the first configuration information entry having the database table format is provided from the configuration directory to the software application program in response to a request.

15. The computer program product of claim 14 wherein the configuration information entries are organized in the configuration repository based on a particular type of industry being associated with a particular configuration information entry having a particular value.

16. The computer-readable medium of claim 14, wherein the first configuration information entry is selected based on a received indication of a configuration information set, which comprises an indication of a market segment that includes an indication of an industry.

17. The computer-readable medium of claim 14, wherein storing the configuration information entries comprises:
receiving, from the repository, a first configuration information portion in the repository;
receiving, from the repository, a second configuration information portion in the repository selected by the repository based on a hierarchical relationship between the first configuration information and the second configuration information; and
storing the first and second configuration information portions in the configuration directory.

18. The computer-readable medium of claim 14, wherein the configuration directory is configured to provide faster runtime access than the configuration repository.

19. The computer-readable medium of claim 14, wherein the first configuration information entry is selected based on a received indication of a configuration information set, which comprises an indication of a market segment that includes an indication of an industry, the indication received based on selections received from the user in response to progressive user prompts that progressively prompt the user for increasing detail about a market segment.

20. A method of handling configuration information, the method comprising:
receiving an indication of at least a first configuration information entry at a first computer storing a configuration directory and a repository containing multiple entries of configuration information for a software application program, each entry designed for customizing the software application program for a specific situation and the software application program being designed to remotely request configuration information as needed, wherein each configuration information entry includes 1) a configuration component available to be requested for the software application program and 2) a configuration attribute and an associated attribute value that define terms for the software application program to apply to a business transaction of a business enterprise in the specific situation, wherein the configuration repository stores the multiple entries of configuration information in XML format;
activating a stored process on the first computer that converts the first configuration information entry from the XML format to a database table format in which access to the first configuration information entry is faster than in the XML format; and
storing the first configuration information entry in the configuration directory in the database table format, the configuration directory being remote from the software application program and different from the configuration repository, wherein the first configuration information entry having the database table format is provided from the configuration directory to the software application program in response to a request.

21. The method of claim 20, wherein the terms include at least one of a percentage rate and a payment due date.

22. The method of claim 20, wherein storing the first configuration information entries comprises:

receiving, from the repository, a first configuration information portion in the repository;

receiving, from the repository, second configuration information portion in the repository selected by the repository based on a hierarchical relationship between the first configuration information portion and the second configuration information portion; and storing the first and second configuration information portions in the configuration directory.

* * * * *